United States Patent
King

(10) Patent No.: US 6,421,392 B1
(45) Date of Patent: Jul. 16, 2002

(54) SINGLE-SOURCE MULTIDROP COMMUNICATION SYSTEM

(75) Inventor: George King, Pompano Beach, FL (US)

(73) Assignee: Siemens Information and Co-munication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/000,523

(22) Filed: Dec. 30, 1997

(51) Int. Cl.[7] .............................................. H04L 27/00

(52) U.S. Cl. ...................................... 375/259; 359/152

(58) Field of Search ................................. 375/219, 220, 375/259, 257; 370/241, 249; 359/152, 154

(56) References Cited

U.S. PATENT DOCUMENTS

| | | | | |
|---|---|---|---|---|
| 3,862,363 A | * | 1/1975 | Tanimoto | |
| 3,976,873 A | * | 8/1976 | Bottka et al. | |
| 4,727,593 A | * | 2/1988 | Goldstein | |
| 5,164,960 A | * | 11/1992 | Wincn et al. | 375/220 |
| 5,249,183 A | * | 9/1993 | Wong et al. | 370/85.3 |
| 5,467,369 A | * | 11/1995 | Vijeh et al. | 375/224 |
| 5,566,160 A | * | 10/1996 | Lo | 370/13.1 |
| 5,668,814 A | * | 9/1997 | Balatoni | 370/540 |
| 5,828,754 A | * | 10/1998 | Hogan | 380/49 |

* cited by examiner

Primary Examiner—Jean Corrielus

(57) ABSTRACT

A digital communications system can be configured with a single transmitter and passive remote stations that encode data by attenuating signals. In one optical arrangement, a single transducer serves as a receiver and modulator. In another arrangement, multiple channels permit full duplex communication.

17 Claims, 9 Drawing Sheets

SINGLE-SOURCE MULTIDROP COMMUNICATION SYSTEM

BACKGROUND OF THE INVENTION

In multiple station bidirectional communications systems, each station requires a means of transmitting information. Conventionally, separate transmitters are provided for each station. This, however, adds to the complexity and cost of a system.

A single transmitter system can be configured by using one transmitter that generates a series of pulses or other data units for distribution over a network. One or more of the pulses or data units can be encoded with information by the transmitter or any of the stations and then subsequently decoded. This scheme has application to local area networks, wide area networks, and fiber circuits to the home or curb.

BRIEF DESCRIPTION OF DRAWINGS

A more complete understanding of the present invention, as well as other objects and advantages thereof not enumerated herein, will become apparent upon consideration of the following detailed description and the accompanying drawings, wherein.

DESCRIPTION OF THE INVENTION

Figure 1:
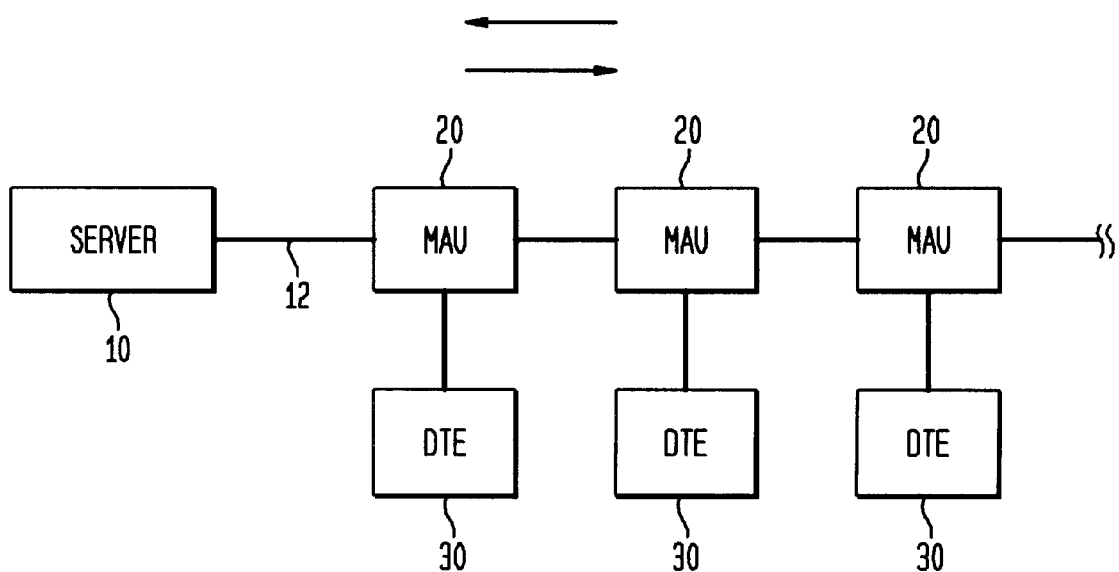
FIGS. 1–3 are functional block diagrams of laser communications systems utilizing a single laser source.

A communications system requiring but a single source is shown in the functional block diagram of FIG. 1. In this example, the source is a laser and the transmission line is optical fiber cable, but it should be understood that other types of energy could be utilized. A server 10 broadcasts a carrier that can be encoded with information on a transmission line 12. Media attachment units (MAU) 20 located at various points along the transmission line 12 intercept the information. Each media attachment unit 20 functions as a receiver and modulator, and connects to a data terminal equipment module 30.

Figure 2:
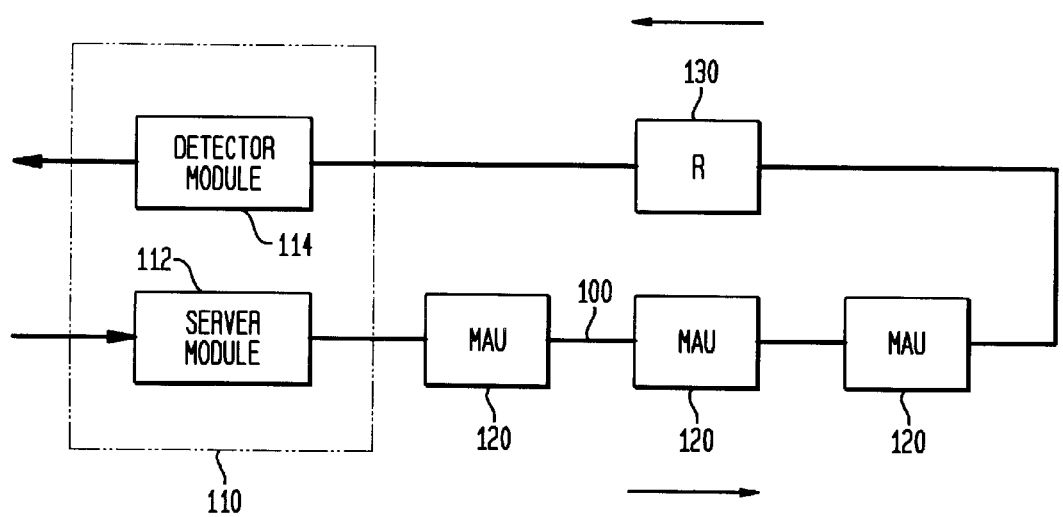

At least two configurations are contemplated for the transmission line 12. As shown in FIG. 2, the transmission line 100 can be in the form of a loop, where the server 110 has a server module 112 at one end of the loop and a detector module 114 at the other end. The media attachment units 120 are distributed around the loop along the transmission line 100. (The data terminal equipment modules are omitted but would be connected to the media attachment units.) The arrow indicates the direction of transmission over the line 100. If the length of the line necessitates amplification, a repeater 130 can be placed in the line 100.

Figure 3:
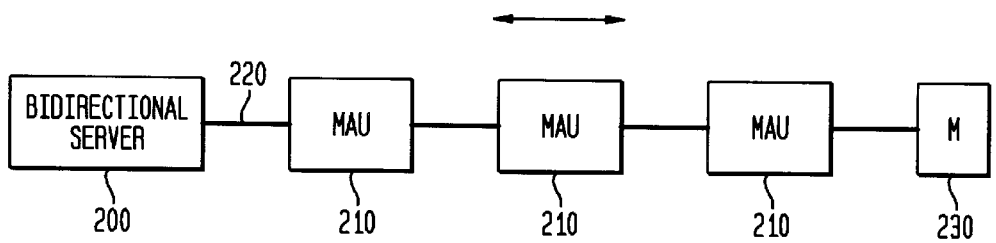

Instead of a loop, the single-ended configuration of FIG. 3 can be employed. A bidirectional server 200 and media attachment units 210 are distributed along a transmission line 220. A mirror 230 sends the pulses back to the bidirectional server 200.

One format for the carrier transmitted by the server is a series of pulses using a return-to-zero convention, i.e., off is zero or the absence of a signal. The individual pulses in a given series are specifically allocated to the server and the subscribers or clients. For example, the first pulse in a group of eight might be a framing pulse, indicating the beginning of a word. The next pulse may be dedicated to the server, and the subsequent six pulses allocated to six media attachment units.

The leading edge of each pulse serves as the clock for timing purposes and is at maximum amplitude. The trailing edge of each pulse is either at maximum amplitude (indicating a digital value of 1) or modulated by suppression or attenuation of 25–100% of maximum amplitude (indicating a digital value of 0). For the server, the trailing edge of a pulse can be shortened by using a fast clock to set the duration of the transmitted pulse or any other suitable scheme to decrease the time (and therefore the width) of the pulse. For the various media attachment units, the trailing edges of the respective pulses are suppressed or attenuated as they pass through the media attachment unit.

Figure 4:
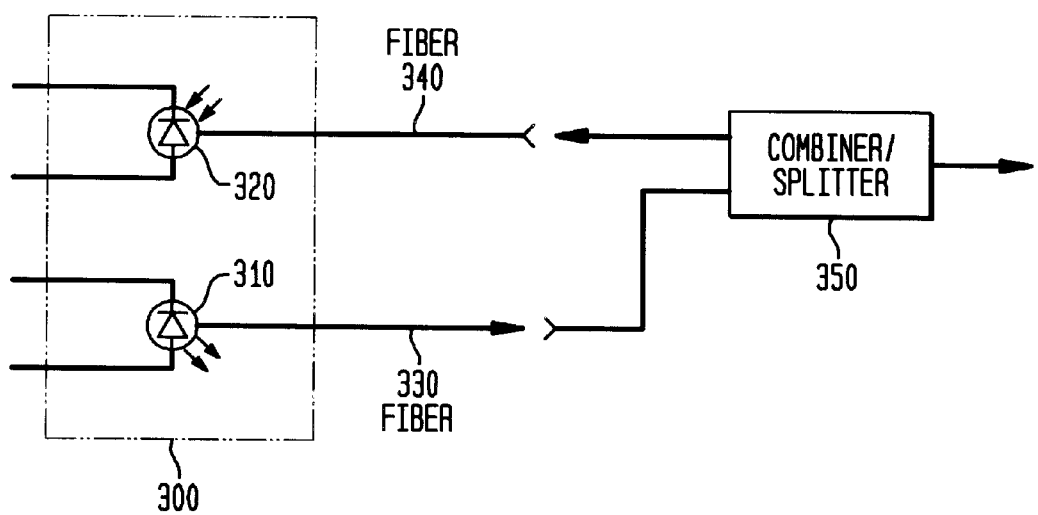
FIG. 4 is a schematic diagram of a server.

The server includes a transmitter and a receiver. In a laser system, the transmitter could have a laser diode directing energy into the transmission line and a photodetector for sensing incoming light pulses. As illustrated in FIG. 4, a server 300 has a laser diode 310 and a photodetector 320. Where the system is configured as a loop (FIG. 2), the fiber optic cables 330 and 340 adjacent the laser diode 310 and the photodetector 320, respectively, connect to appropriate ends of the transmission line (100 in FIG. 2). However, in a single-ended system (FIG. 3), a combiner/splitter 350 is provided to join the two fiber cables 330 and 340 to the transmission line (220 in FIG. 3).

Figure 5:
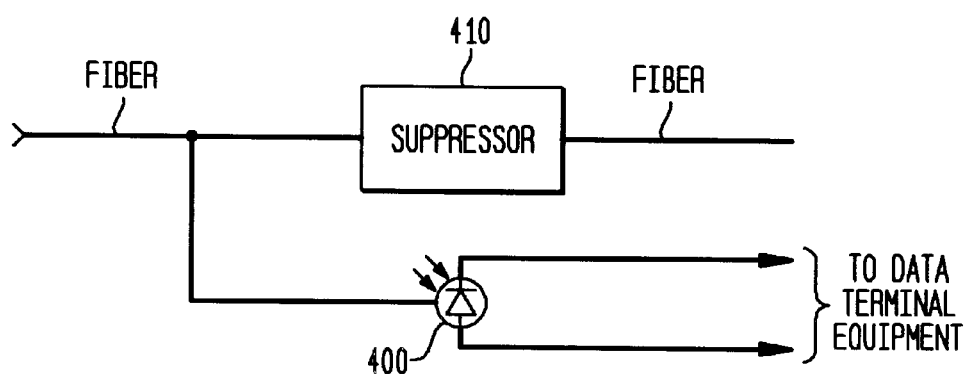
FIGS. 5 and 6 are schematic diagrams of a media attachment unit.

The media attachment unit consists of a detector and a modulator that suppresses, attenuates, absorbs, or otherwise modulates the signal on the line. In one arrangement for an optical system, illustrated in FIG. 5, the detector 400 is a discrete photodetector and the modulator 410 is any device that will attenuate the light. For example, the modulator 410 may be a Q-switch, a piezoelectric device, a variable light shutter such as a liquid crystal device, ferroelectric fluids, elastomers, or any other means that will suppress, attenuate, or modulate light.

Figure 6:
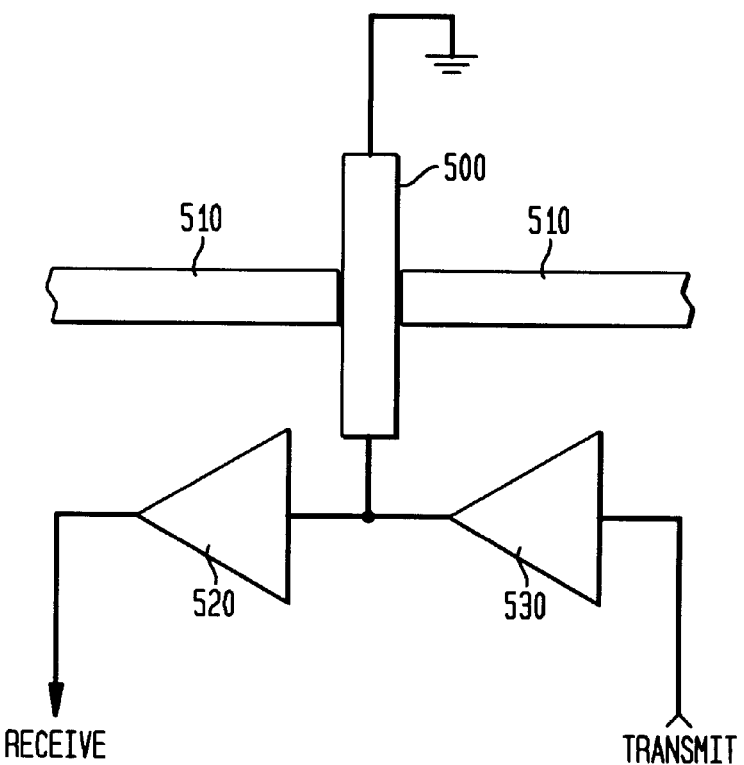

Instead of a media attachment unit containing discrete components, a transducer that can act as both detector and modulator can be employed. As illustrated in FIG. 6, a transducer 500 is placed between two sections of fiber line 510. If a pulse transits the fiber line 510, the transducer 500 develops a voltage detected by a sense amplifier 520 that provides an output signal to a receiver (not shown) in the data terminal equipment. If a signal is to be sent, a drive amplifier 530 places a suitable modulation on the transducer 500, attenuating the light passing through. Materials such as polyvinylidene flouride (PVDF), ferroelectric liquid crystalline elastomers, and other materials exhibiting both pyroelectric and piezoelectric characteristics may be employed.

Figure 7:
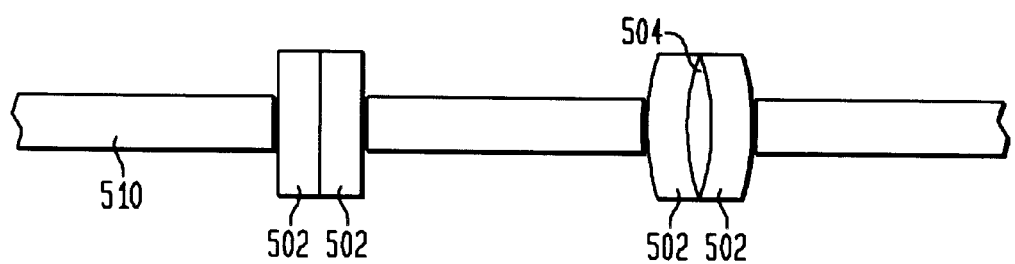
FIG. 7 is a schematic diagram of multiple transducers in a media attachment unit.

Multiple, layered transducers could be employed instead of the single element transducer 500 shown in FIG. 6. Where there are two layers 502, as shown in FIG. 7, the layers 502 could be excited to push away from each other, opening a gap 504 therebetween but closing the gap when the excitation is removed and the layers relax. Three or more layers could also be utilized.

The information transmitted may be encoded in a number of ways. For example, the words or frames can be allocated using a time division multiplexing scheme, dedicating specific bits in a word or words to the server and the various clients or subscribers. In such an arrangement, the bandwidth will be divided among the number of dedicated stations.

Alternatively, by using a carrier sense, media access, collision detection scheme (CSMA/CD), such as IEEE Standard 802.3, any station would have access to virtually the entire bandwidth. With this latter scheme, the station wishing to transmit would first determine that no other station is transmitting via encoding pulses by suppression or attenuation by observing pulses for a given period and that there is no modulation or suppression of pulses and then begin encoding the pulses by suppression or attenuation. Normally, a quiet line can be detected by a series of unmodulated pulses over a predetermined period of time. To avoid confusion of an unmodulated string with a series of "ones" (or "zeros"), the data should be scrambled with a few zeroes.

Figure 8:
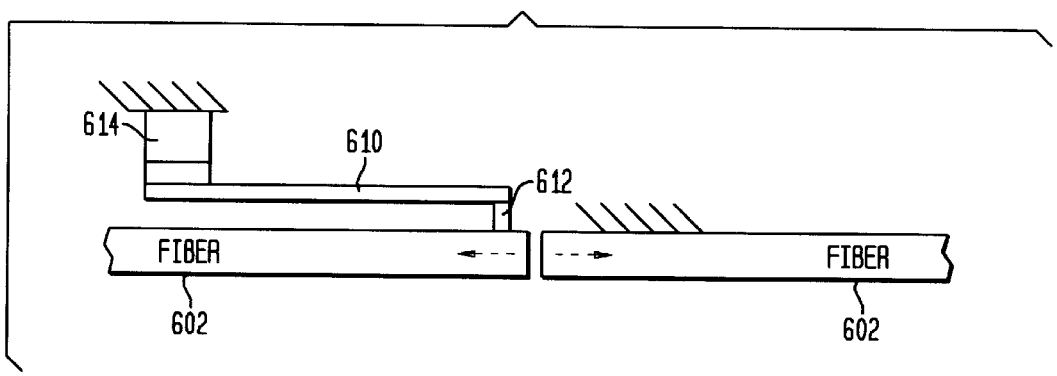
FIGS. 8 and 9 are diagrams of a piezoelectric "bending" attenuator/modulator.
Figure 9:
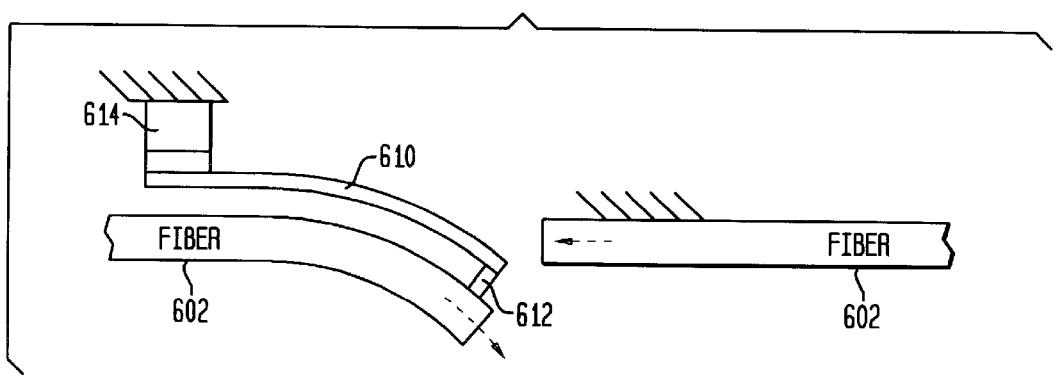

A piezoelectric bending device that will act as a modulator is illustrated in FIGS. 8 and 9. A fiber 600, cut into two sections 602, has a piezoelectric bending device 610 attached to one of the sections 602 by some appropriate fixture 612; the device 610 itself is rigidly attached through another fixture 614. Initially, the two fiber sections 602 are aligned coaxially, allowing light to travel between the sections 602 with little loss, assuming a small gap. When a voltage is applied to the piezoelectric bending device 610, the device 610 bends, causing the attached section 602 to similarly move, as shown in FIG. 9. Although FIG. 9 shows a large displacement, a relatively small displacement should break the flow of light between the sections since the diameter of the core of a fiber is generally quite small.

In a variation of the arrangement of FIGS. 8 and 9, piezoelectric bending devices could be used with both sections 602 to obtain greater displacement, by bending in opposite directions (e.g., up and down).

Figure 10:
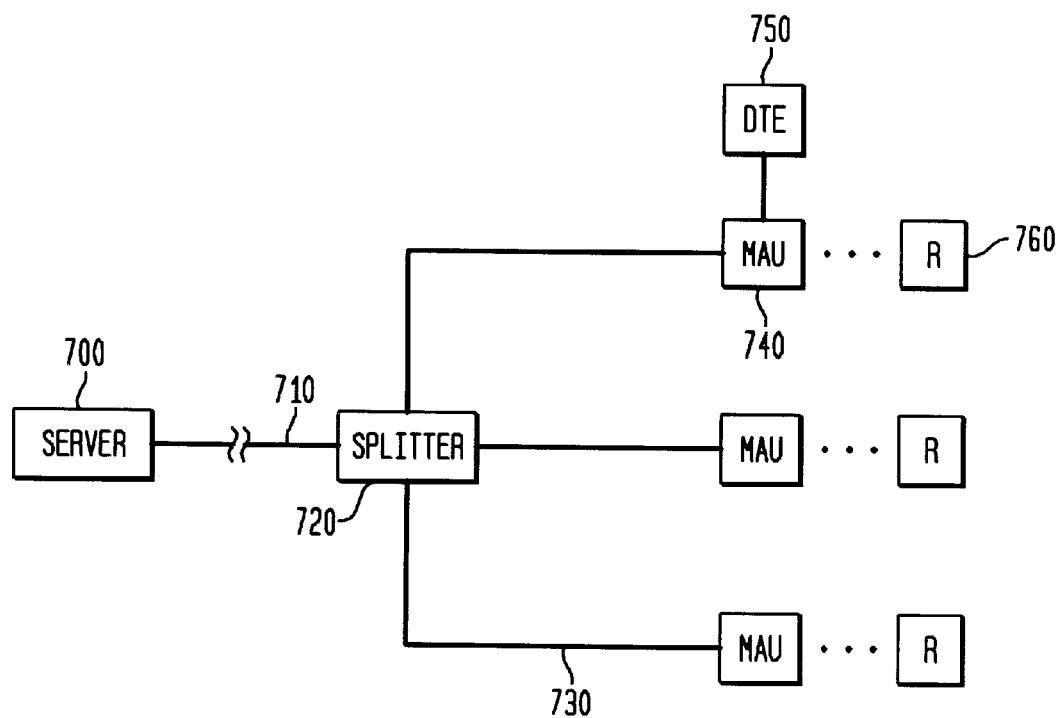
FIG. 10 is a functional block diagram of a "star" or "hub-and-spoke" configuration laser communications system utilizing a single laser source.

Instead of using the loop or single-ended configurations of FIGS. 2 and 3, a star or hub-and-spoke arrangement could be utilized, as shown in FIG. 10. A server 700 again generates a carrier that can contain information provided by the server 700. This carrier is placed on a transmission line 710 such as a fiber optic cable connected to a splitter 720.

The splitter 720 is connected to two or more subscriber lines 730, depending the need and the capacity of the system. Each subscriber line 730 terminates in a media attachment unit 740 connected, as shown by example for one unit, to a data terminal equipment module 750. As in the other configurations, a detector (not shown) in the media attachment unit 740 is used to detect and decode transmissions received from the server 700.

In an optical system, the media attachment unit 740 could contain a reflector or reflecting device 760. Any light reaching the reflector 760 would be reflected back to the server 700. Using a light shutter or some other suitable mechanism, the media attachment unit 740 blocks the passage of light when it does not wish to send information. Consequently, none of the energy reaching the media attachment unit 740 would be reflected back to the server 700. However, when information is to be sent back to the server 700, the media attachment unit 740 would allow selected pulses to reach the reflector 760 and then travel back to the server 700. In utilizing the approach of FIG. 10, a provision such as IEEE Standard 802.3, for example, should be made to avoid conflicts between subscribers.

It should be recognized that a variety of signals, including optical, laser, and radio frequency (RF) including microwave, may be used with this scheme. In an RF-based system, a PIN-diode could be employed for the modulator in the media attachment unit and a standard RF receiver for the detector. Further, systems of the kind discussed here may serve as the physical layer (layer 1) in a communications system organized according to the open systems interconnection (OSI) model.

It should also be understood that other conventions for coding may also be employed as will readily occur to those skilled in the art. In addition to different coding schemes, an optical system could take advantage of different polarizations and wavelengths for coding.

Figure 11:
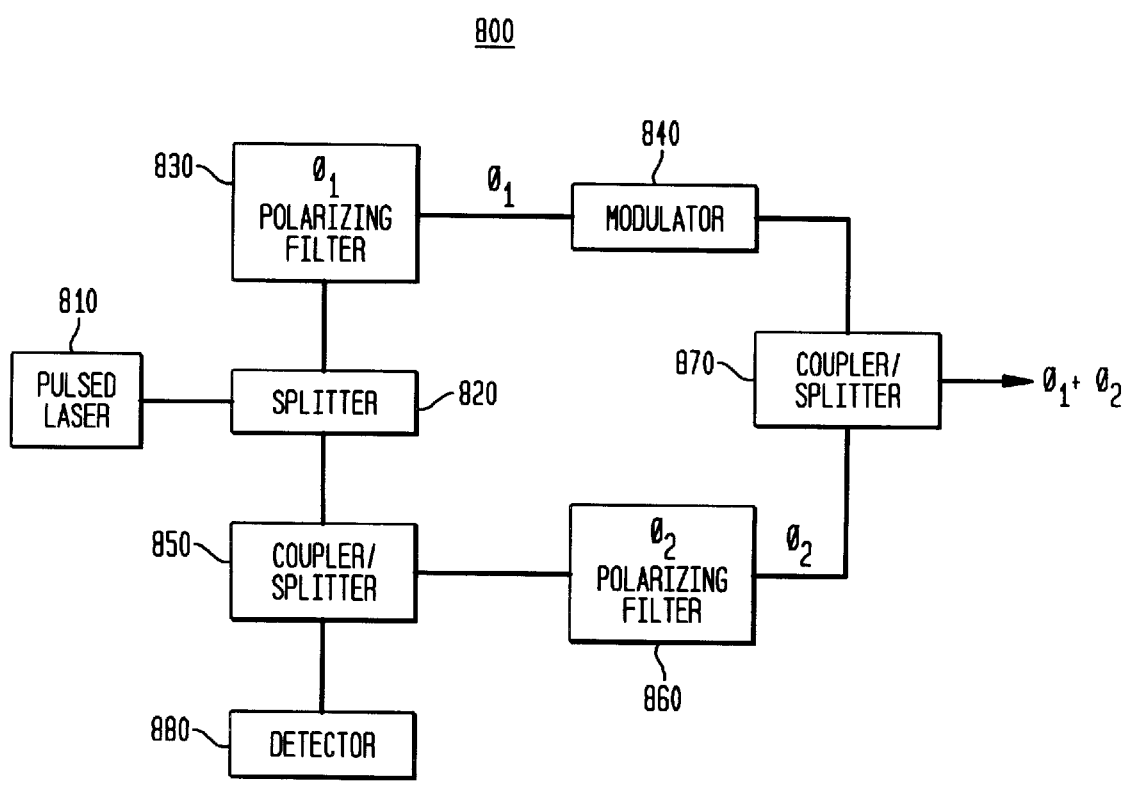
FIGS. 11 and 12 are block diagrams of a server and a media attachment unit, respectively, for a dual-polarization laser communications system.

Full duplex communication can be achieved by using multiple channels. For example, a dual-polarization optical scheme could use one polarization for the server and the other for the subscribers. A server 800 that offers a dual-polarization output signal is shown in FIG. 11. The server 800 has a pulsed laser 810 that generates a square wave unpolarized output. A splitter 820 provides the unpolarized output to a $\phi_1$ polarizing filter 830. The output of the $\phi_1$ polarizing filter 830 is modulated by a modulator 840 (or passed through without any modulation). The splitter 820 also provides the output of the pulsed laser 820 to a bidirectional coupler/splitter 850 which in turn feeds a $\phi_2$ polarizing filter 860. The $\phi_1$ and $\phi_2$ outputs of the modulator 840 and the $\phi_2$ polarizing filter 860 are then combined in a second bidirectional coupler/splitter 870. Finally, a detector 880 is connected the first bidirectional coupler/splitter 850. When the $\phi_2$ polarization returns from the subscribers, it passes back through the second bidirectional coupler/splitter 870, the $\phi_2$ polarizing filter 860, and the first bidirectional coupler/splitter 850, and then enters the detector 880.

Figure 12:
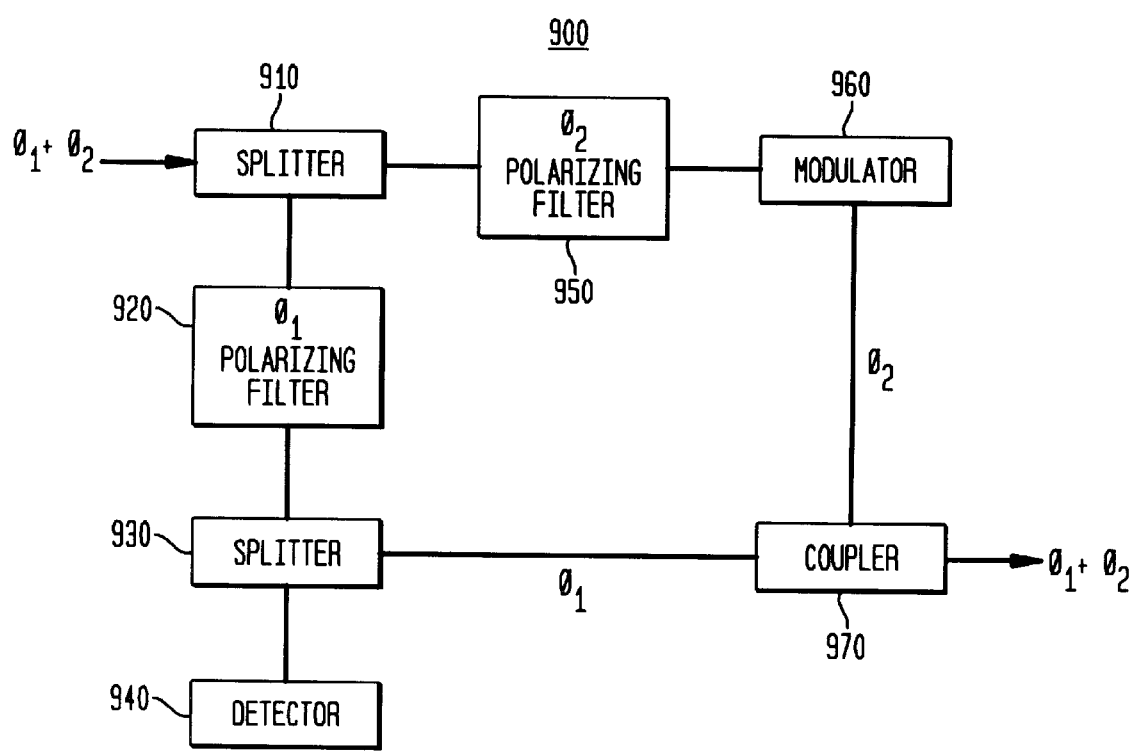

A media attachment unit 900 compatible with the server 800 of FIG. 11 is illustrated in FIG. 12. The combined $\phi_1$ and $\phi_2$ polarizations enter a first splitter 910. One output of the splitter 910 enters a polarizing filter 920, a second splitter 930, and then a detector 940. The other output of the first splitter 910 passes to a $\phi_2$ polarizing filter 950. The $\phi_2$ polarization passes through a modulator 960 which either modulates the light or passes it through. Finally, the modulated (or unmodulated) $\phi_2$ polarization and the $\phi_1$ polarization are recombined in a coupler 970.

Figure 13:
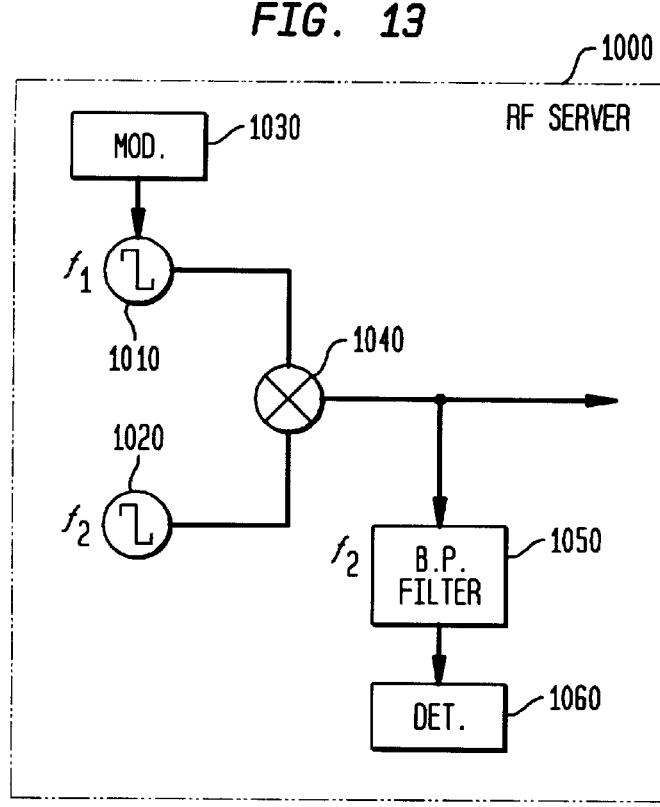
FIGS. 13 and 14 are block diagrams of a server and a media attachment unit, respectively, for a dual-frequency, radio-frequency communications system.

A duplex system can also be realized in RF (radio frequency). A dual-channel server 1000, shown in FIG. 13, has individual frequency-burst wave generators 1010 and 1020 for the two channels, $f_1$ and $f_2$. A modulator 1030 modulates the signal produced by one of the generators (here, $f_1$). The two signals are then combined in a mixer 1040 and broadcast to the subscribers. On the return, a bandpass filter 1050 extracts the $f_2$ signal and a detector 1060 detects the information placed on the signal by one of the subscribers.

Figure 14:
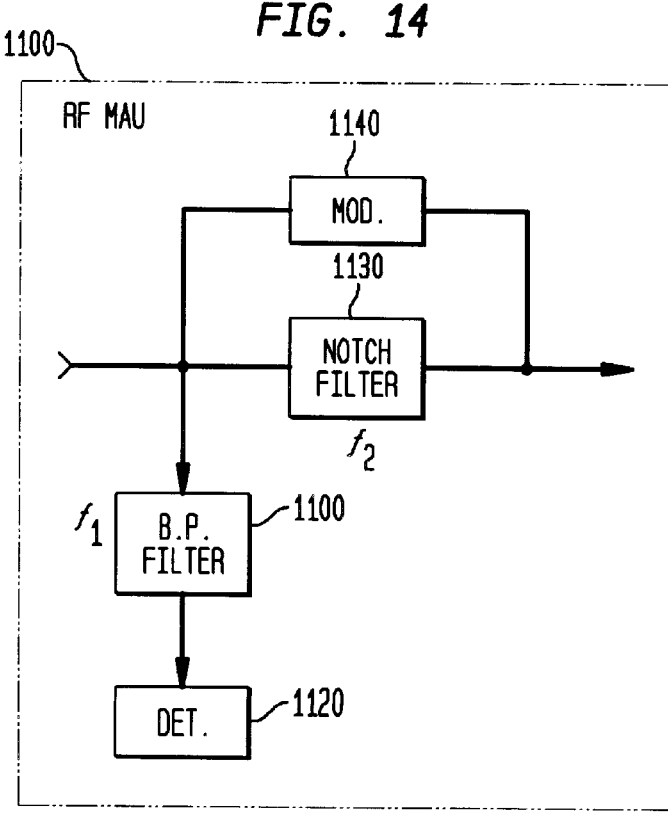

A compatible media attachment unit 1100 is shown in FIG. 14. A band pass filter 1110 extracts the $f_1$ signal and a detector 1120 detects the information placed on the signal by the server. The media attachment unit 1100 modulates the $f_2$ signal with a combination of a notch filter 1130 and a modulator 1140. When no modulation is desired, the modulator 1140 acts a bypass around the notch filter 1130. To modulate the signal, the modulator breaks the bypass, forcing the entire signal into the notch filter 1130. Since the notch filter 1130 blocks only the $f_2$ signal, the $f_1$ signal passes freely.

What is claimed is:

1. A system, comprising:
    a server comprising
        means for generating a carrier;
        means for encoding information on the carrier; and
        means for detecting information encoded on the carrier;
    a transmission line for conveying the carrier from the server and returning the carrier to the server; and
    at least one media attachment unit interposed on the transmission line, where the media attachment unit comprises
        means for detecting information encoded on the carrier; and
        means for selectively modifying the carrier.

2. A system as set forth in claim 1, where the server comprises means for selectively modifying the encodable carrier.

3. A system as set forth in claim 1, where the transmission line is a loop, or the transmission line is single-ended and the system further comprises means for reflecting at one end of the transmission line.

4. A system as set forth in claim 1, where the transmission line comprises a plurality of transmission line segments, where each segment conveys the encodable carrier between the server and media attachment unit.

5. A system as set forth in claim 4, further comprising means, associated with each segment, for selectively reflecting, suppressing, attenuating, absorbing, or modulating the encodable carrier.

6. A system as set forth in claim 1, where the means for generating encodable a carrier comprises means for generating a series of pulses, and the means for selectively modifying the encodable carrier comprises means for selectively suppressing, attenuating, absorbing, or modulating a portion of a pulse.

7. A system as set forth in claim 1, where the means for generating a carrier comprises means for generating a series of pulses, and the means for selectively modifying the carrier comprises means for selectively suppressing, attenuating, absorbing, or modulating the trailing edge of a pulse.

8. A system as set forth in claim 1, where
    the means for generating a carrier comprises means for generating a carrier comprising a plurality of channels;
    the means for encoding comprises means for encoding the information on one or more channels of the carrier:
    the means for detecting comprises means for detecting the information encoded on a first channel of the carrier; and
    the means for selectively modifying comprises means for selectively modifying a second channel of the carrier.

9. A system as set forth in claim 1, where the means for detecting and the means for selectively modifying of the media attachment unit comprise a transducer.

10. A system as set forth in claim 9, where the transducer comprises a sheet of ferroelectric material.

11. A single-source communications system, comprising:
    a server for generating, selectively modifying, and detecting a carrier comprising a series of pulses, the server comprising a source for generating the carrier;
    a transmission line for conveying the carrier from the server and returning the carrier to the server; and
    at least one media attachment unit interposed on the transmission line, where, the media attachment unit comprises a detector for detecting, and a modulator for selectively modulating, the carrier generated by the server.

12. A method for conveying information on a carrier conveyed over a transmission line between a server and at least one media attachment unit, comprising the steps of:
    generating a carrier at the server;
    encoding information on the carrier;
    conveying the carrier from the server to the media attachment unit;
    detecting the encoded information and selectively modifying the carrier at the media attachment unit; and
    returning the carrier to the server.

13. A method as set forth in claim 12, further comprising the step of selectively modifying the carrier at the server.

14. A method as set forth in claim 12, where the step of generating a carrier comprises the step of generating a series of pulses, and the step of selectively modifying the carrier comprises the step of selectively suppressing, attenuating, absorbing, or modulating a portion of a pulse.

15. A method as set forth in claim 12, where the step of generating a carrier comprises the step of generating a series of pulses, and the step of selectively modifying the carrier comprises the step of selectively suppressing, attenuating, absorbing, or modulating the trailing edge of a pulse.

16. A method as set forth in claim 12, where
    the step of generating a carrier comprises the step of generating a carrier comprising a plurality of channels;
    the step of detecting the encoded information and selectively modifying the carrier comprises the steps of
        detecting the information encoded on a first channel of the carrier; and
        selectively modifying a second channel of the carrier.

17. A method for communicating information conveyed by a carrier over a transmission line between a server and at least one media attachment unit, comprising the steps of:
    generating a carrier comprising a series of pulses at the server;
    selectively modifying the carrier at the server;
    conveying the carder from the server to the media attachment unit;
    detecting and selectively modifying the carrier at the media attachment unit; and
    returning the carrier to the server.

* * * * *